Figure 1:
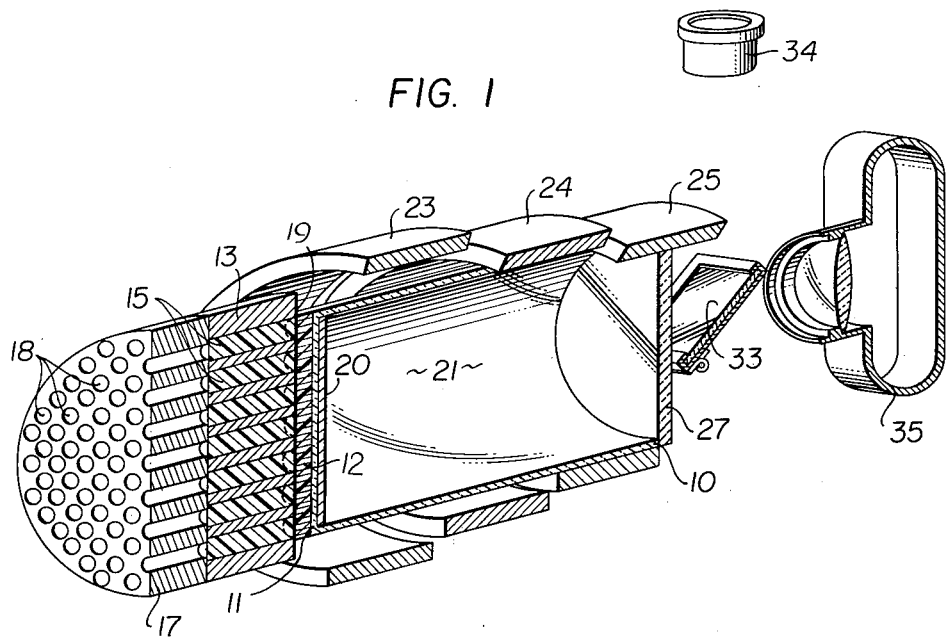

Aug. 7, 1962

R. W. CARLSON 3,048,698

SCINTILLATION CAMERA

Filed March 11, 1959

INVENTOR.
ROLAND W. CARLSON
BY Pyle & Fisher
ATTORNEYS

United States Patent Office

3,048,698
Patented Aug. 7, 1962

3,048,698
SCINTILLATION CAMERA
Roland W. Carlson, East Cleveland, Ohio, assignor to Picker X-Ray Corporation, Waite Mfg. Div., Inc., Cleveland, Ohio, a corporation of Ohio
Filed Mar. 11, 1959, Ser. No. 798,632
8 Claims. (Cl. 250—71.5)

This invention pertains to a gamma ray sensitive device and more particularly to a device of the class known as scintillation cameras.

In examining the thyroid glands and other parts of the body, physicians frequently cause their patients to swallow small quantities of radioactive substances. The movement of the radioactive substance through the body and absorption by organs of the body is then traced and recorded to provide diagnositic information. This technique is sometimes referred to as a "tracer study."

Physicians have previously traced such radioactive substances with devices known as "scanners." A scanner has a scintillation probe which is moved at a preselected speed along a series of parallel paths over the portion of the patient's anatomy that is being analyzed. The probe is connected, through a mechanical linkage, to a recording pen or other stylus which records dots on a sheet of paper. Gamma radiation causes the probe to impart impulses to the tracing mechanism in a manner which causes the stylus to place a dot on the sheet of paper. Such dots are recorded in geometrical correspondence to the activity being measured. Dots may also be provided on a film through a light emitting mechanism which is responsive to the activity measured by the probe. When a scan has been completed the dots on the film or paper provide a graphic interpretation of the distribution of radioactive material in the portion of the anatomy being observed.

These mechanical systems are quite complicated and subject to mechanical failures. They also require substantial periods of time for a complete examination or "scan" to be conducted, especially since it is customary to repeat the scan two or three times at different speeds. The result is such studies are expensive because of the time required of the operator. Such studies are also extremely uncomfortable for the patient because of the protracted period of time required. The data recorded also requires complex electronic apparatus for proper assay of the data.

Prior known devices also have the disadvantage of being unreliable because they are complicated. They also have a very real, if intangible, disadvantage in that there is a great deal of psychlogical discomfort to a patient when he is placed under a complicated, unsightly, and alien device.

Some attempts have also been made to use scintillation cameras for such tracer studies. These attempts have not been satisfactory because an abnormally long exposure is required before a usable photograph is obtained.

Accordingly, one of the principal objects of this invention is to provide a novel and improved scintillation camera which is simple, compact and dependable.

Another object of the invention is to provide a novel and improved scintillation camera which produces quick and accurate diagnostic photographs.

An additional object of the invention is to provide a scintillation responsive device in combination with an amplification system to permit accurate photographic studies with a minimum of patient exposure and discomfort.

Still another object of the invention is to provide a novel and improved scintillation camera which covers a sufficient area to permit an image of any one of the body organs normally subjected to radioactive diagnostic technique to be viewed in its entirety at one time.

A further object of the invention is to provide a novel and improved scintillation camera which permits either direct visual observation of the organ image at the time when it holds radioactive material, or formation of a permanent photographic record of the organ image when it has such radioactive material in it.

When a given body organ is subjected to a radioactive diagnosis it is often desirable to observe images of changes in that organ. At other times it is desirable to have an instantaneous record of a condition at any given moment. With the mechanical scanner previously described, it will be recognized that parts of the organ are scanned a substantial period of time before other parts of the organ are scanned. The result is that no true picture of the organ at any given time is obtained. All that is obtained is a sequentially obtained image of the activity in and around the organ.

Accordingly, one of the principal objects of this invention is to provide a device which will permit a study of short duration, or a serial study, revealing changes in an organ over a period of time, when it contains radioactive material.

Figure 2:
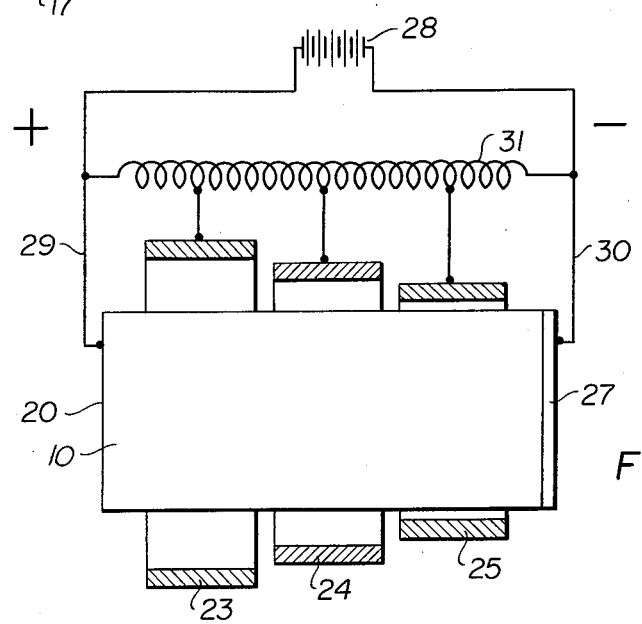

Other objects and a fuller understanding of the invention may be had by referring to the following description and claims taken in conjunction with the accompanying drawings, in which:

FIGURE 1 is a sectioned perspective and somewhat schematic view of one of the novel and improved scintillation cameras; and, FIGURE 2 is a schematic wiring diagram of an amplifier tube employed in the device.

Referring to the drawings and to FIGURE 1 in particular, an image amplifier tube 10 is provided. The tube has a light transmitting end window 11. A plurality of optically isolated glass fibers which are fused together are optically coupled to the end window 11. The glass fibers are disposed so that they generally parallel the axis of the tube 10. These parallel fibers may be referred to as "light pipes."

A scintillation grid 13 is carried adjacent the window 11. A plurality of longitudinally extending gamma ray sensitive phosphors or crystals are carried by the scintillation grid 13. The phosphors 15 may be shaped, as by extrusion, and inserted in openings or passages in the grid 13. The phosphors may be pressed into such passages. Alternately, phosphor crystals are actually grown in the grid to provide inexpensive high quality crystals which fill the passages of the grid. The phosphors are of a high gamma ray detection efficiency and are efficient in converting the gamma ray energy into light energy. An example of such a phosphor is sodium iodide activated with thallium.

An optical density filter 19 is interposed between the phosphors 15 and the end window. The purpose of the filter is to normalize the output of each phosphor to a common light output level since the light output may vary from phosphor to phosphor due to differences in optical properties of the detector mountings. The filter 19 may take the form of a film negative which has been exposed by the light output from a uniform gamma radiation source. With the filter positioned nonuniform phosphors will provide uniform output from a uniform source and therefore a true comparison when there is a nonuniform source.

The grid is formed of an opaque material which will prevent "cross talk" of light and, if desired, any stray radioactive radiation between the crystals. Leaded milk glass and tungsten are examples of materials which are satisfactory for the grid.

A collimator 17 is positioned against the grid 13. The collimator 17 is formed of lead or other suitable material which will absorb radioactive rays. The collimator 17 has a plurality of longitudinally extending gamma ray transmitting through apertures or passages 18. Each of the apertures 18 is in axial alignment with one of the crystals 15. Since the collimator 17 is formed of lead or other gamma ray absorbing material, it will absorb most of the rays other than those traveling along paths which substantially parallel the axis of the apertures 18 and pass through an aperture. Since each collimator passage 18 accepts substantially no gamma radiation other than from that portion of the organ directly in line with it, the unit provides an accurate pictorial representation of the organ being studied.

Gamma radiation which passes through the collimator passages 18 strikes the phosphor crystals 15. The crystals 15 convert the gamma ray energy to light energy. The light energy emitted by the crystals 15 is transmitted by the light pipe 12 to the window 11 and then to a thin photocathode layer 20. The photocathode layer 20 covers the inner end of the window 11. For clarity of illustration the thickness of the photocathode is greatly exaggerated in the drawings. The light pipe 12 facilitates the use of the disclosed curved photocathode 20 without light dispersion or "cross-talk."

The image amplifier tube 10 has an evacuated or vacuum chamber 21 through which electrons emitted by the photocathode are transmitted. A preferred type of image amplification tube is shown for illustration. This tube has a plurality of charged electrostatic rings 23, 24, 25. Electrons passed through the vacuum chamber 21 are accelerated by the electrostatic rings in the well known manner. As measured from the window end toward the opposite end of the tube, the electrostatic rings are of progressively decreasing diameter to focus the electrons passed through the vacuum chamber 21 into a smaller area as they are accelerated. The electrons bombard a phosper end 27 which provides an amplified visual image.

A source of direct current potential 28 is connected to the photocathode 20 and to the end phosphor 27 by conductors 29, 30. The source of electric potential 28 is so connected to prevent the photocathode 20 from assuming a positive charge and thereby stopping the flow of electrons. Thus, the source of electric potential and the conductors 29, 30 can be said to provide means to neutralize the charge between the cathode 20 and the end phosphor 27. The source of electric potential 28 is also connected to the electrostatic rings 23, 24, 25 through a resistance 31 to provide and maintain the charge in the rings. The resistance is connected to the conductors 29, 30 to place it in parallel with the tube 10.

The mechanism described has the outstanding advantage of being able to provide in a relatively short period of time, an amplified pictorial image of the overall appearance of, as an example, a thyroid gland. A mirror 33 and an eye piece 34 may be used to permit visual observation of an image of the anatomical part under study. A movie camera shown schematically at 35 provides a permanent record of the study in pictorial form. At the option of the operator visual observation may be made followed by a pictorial recording of the study or the entire study may be photographed.

Another of the outstanding advantages of the invention is that with either visual observation or the movie camera record it is possible to observe images of changing conditions in the anatomical part being analyzed. It will also be apparent that any psychological fear on the part of the patient has been eliminated. The described device is simple, dependable, and rugged, and one which will permit practically instantaneous studies to be conducted.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A scintillation camera comprising, a collimating head having a plurality of longitudinally extending unobstructed apertures therethrough, a light impervious scintillation grid in juxtaposed relation to said head, said grid having a through passage in alignment with each of said apertures, a phosphor crystal transversely filling each of said passages, an image amplification means including an amplifier tube in juxtaposed relationship with said grid to transmit and amplify the output of said tube, and visually observable light responsive means disposed to receive the output of said tube.

2. A scintillation camera comprising, a radioactive ray absorbing collimator head having a plurality of longitudinally extending gamma ray conducting passages, a light impervious scintillation grid in juxtaposed relationship with said head, a plurality of phosphor crystals carried by said grid, each of said crystals being in axially aligned relationship with one of said passages, said crystals being optically insulated from each other, an amplification tube having a glass fiber light pipe window at one end thereof, said window fibers having first and second ends, the fiber first ends being in juxtaposition with said crystals, an electron emitting cathode laminate disposed across and adjacent to the second ends of said fibers; said tube having an elongated evacuated chamber in axial alignment with said passages, crystals, and fibers; said tube having a phosphor end longitudinally spaced from said cathode laminate, a plurality of electron accelerating and focusing electrostatic rings, each of the rings being concentrically disposed around said tube, means to charge said rings, means to neutralize the charge of said cathode and said phosphor end, a camera in focal alignment with said tube, and phosphor end image visual observation means selectively positionable for observation of the image emitted by said phosphor end.

3. A scintillation camera comprising, a radioactive ray absorbing collimator head having a plurality of longitudinally extending gamma ray conducting passages, a light impervious scintillation grid in juxtaposed relationship with said head, a plurality of phosphor crystals carried by said grid, each of said crystals being in axially aligned relationship with one of said passages, said crystals being optically insulated from each other, an amplification tube having a glass fiber light pipe window at one end thereof, said window fibers having first and second ends, the fiber first ends being in juxtaposition with said crystals, an electron emitting cathode laminate disposed across and adjacent to the second ends of said fibers; said tube having an elongated evacuated chamber in axial alignment with said passages, crystals, and fibers; said tube having a phosphor end longitudinally spaced from said cathode laminate, a plurality of electron accelerating and focusing electrostatic rings, each of the rings being concentrically disposed around said tube, a camera in focal alignment with said tube, a mirror selectively positionable in axial alignment with said tube to receive the output thereof, and an eyepiece for visual observation of the mirror output.

4. A scintillation camera comprising, a radioactive ray absorbing collimator head having a plurality of longitudinally extending gamma ray conducting passages, a light impervious scintillation grid in juxtaposed relationship with said head, a plurality of phosphor crystals carried by said grid, each of said crystals being in axially aligned relationship with one of said passages, said crystals being optically insulated from each other, an amplification tube having a glass fiber light pipe window at one end thereof, said window fibers having first and second ends, the fiber first ends being in juxtaposition with said crystals, an electron emitting cathode laminate disposed across and adjacent to the second ends of said fibers; said tube having an elongated evacuated chamber in axial alignment with said passages, crystals, and fibers; said tube having a phosphor end longitudinally spaced from said cathode laminate, a plurality of electron accelerating and focusing electrostatic rings, each of the rings being concentrically disposed around said tube, a camera in focal alignment with said tube, and phosphor end image visual observation means selectively positionable for observation of the image emitted by said phosphor end.

5. In the device of claim 4 said gamma ray conducting passages being substantially parallel to each other.

6. A scintillation camera comprising, a collimating head having a plurality of closely spaced longitudinally extending apertures therethrough, a light impervious scintillation grid in juxtaposed relation to said head, said grid having a through passage in alignment with each of said apertures, a scintillation crystal transversely filling each of said passages, an image amplification means including an amplifier tube in juxtaposition relationship with said grid to transmit and amplify the light scintillations from each of said crystals, a glass fiber light pipe window disposed between said grid and said image amplification means, said glass fiber light pipe window facilitating use of the image amplification means without light dispersion and cross-talk and a visually observable light responsive means disposed to receive the output of said tube.

7. The combination of claim 6 having an optical density filter interposed between said crystals and said glass fiber light pipe window, said optical density filter normalizing the output of said crystals.

8. The combination of claim 6 wherein said image amplification means includes a curved cathode positioned adjacent to said glass fiber light pipe window, said glass fiber light pipe window conforming to the curvature of the curved cathode to completely fill the space between the cathode and the scintillation grid and said glass fiber light pipe window facilitating the use of said image amplification means without light dispersion or cross-talk.

References Cited in the file of this patent

UNITED STATES PATENTS

| | | |
|---|---|---|
| 2,139,966 | Loebell | Dec. 13, 1938 |
| 2,550,610 | Smith et al. | Apr. 24, 1951 |
| 2,612,610 | Marshall et al. | Sept. 30, 1952 |
| 2,638,554 | Bartow et al. | May 12, 1953 |
| 2,779,876 | Tobias et al. | Jan. 29, 1957 |
| 2,782,332 | Sheldon | Feb. 19, 1957 |
| 2,883,547 | Ruderman | Apr. 21, 1959 |
| 2,902,604 | Baldwin | Sept. 1, 1959 |
| 2,911,534 | Brannon et al. | Nov. 3, 1959 |
| 2,935,614 | Teichmann et al. | May 3, 1960 |
| 2,939,010 | Scherbatskoy | May 31, 1960 |

OTHER REFERENCES

Newell et al.: Multichannel Collimators for Gamma-Ray Scanning with Scintillation Counters, Nucleonics, July 1952, pp. 36 to 40.